United States Patent
Giannini

(10) Patent No.: US 7,712,035 B2
(45) Date of Patent: *May 4, 2010

(54) MERGED IMAGES VIEWED VIA A VIRTUAL STORAGE CLOSET

(75) Inventor: Robert Giannini, Jersey City, NJ (US)

(73) Assignee: Jarbridge, Inc., Boise, ID (US)

( * ) Notice: Subject to any disclaimer, the term of this patent is extended or adjusted under 35 U.S.C. 154(b) by 1031 days.

This patent is subject to a terminal disclaimer.

(21) Appl. No.: 10/991,912

(22) Filed: Nov. 18, 2004

(65) Prior Publication Data

US 2005/0071257 A1 Mar. 31, 2005

Related U.S. Application Data

(63) Continuation of application No. 09/527,723, filed on Mar. 17, 2000, now Pat. No. 6,903,756.

(60) Provisional application No. 60/159,476, filed on Oct. 14, 1999, provisional application No. 60/167,493, filed on Nov. 24, 1999.

(51) Int. Cl.
    *G06K 15/00* (2006.01)
(52) U.S. Cl. ........................ 715/747; 715/771; 715/837
(58) Field of Classification Search ................. 715/747, 715/746, 771–772, 964, 837, 839, 745
See application file for complete search history.

(56) References Cited

U.S. PATENT DOCUMENTS

| | | | |
|---|---|---|---|
| 3,590,434 A | 7/1971 | Watts, Jr. et al. | |
| 4,149,246 A | 4/1979 | Goldman | 364/200 |
| 4,232,334 A | 11/1980 | Dyson | 358/93 |
| 4,258,478 A | 3/1981 | Scott et al. | |
| 4,261,012 A | 4/1981 | Maloomian | 358/93 |
| 4,297,724 A | 10/1981 | Masuda et al. | 358/93 |
| 4,434,467 A | 2/1984 | Scott | 364/400 |
| 4,514,178 A | 4/1985 | Noto et al. | |
| 4,539,585 A | 9/1985 | Spackova et al. | 358/93 |
| 4,546,434 A | 10/1985 | Gioello | 364/300 |
| 4,731,743 A | 3/1988 | Blancato | 364/521 |

(Continued)

FOREIGN PATENT DOCUMENTS

EP          0 905 563 A2      3/1999

(Continued)

OTHER PUBLICATIONS

"QuickyMart™ Cuts Cost, Eases Set-Up of 'Me-Commerce' Sites" PR Newswire (Jul. 28, 1999).

(Continued)

*Primary Examiner*—Steven P Sax
(74) *Attorney, Agent, or Firm*—Crawford Maunu PLLC

(57) ABSTRACT

An e-commerce method involves on-line viewing of a first article through a linking node for virtual merging on another structure. A particular application of the invention is directed to a method of on-line apparel shopping. The method includes providing a host-site accessible to an on-line viewer (customer) and web-linkable to a retailer having an apparel site. The retailer's apparel site has images of articles stored in a virtual closet. These articles can be apparel from retail stores for viewing over the web, and the on-line viewer is linked to the host-site. The consumer selects a structure, such as a photograph of a person captured in system memory, in response to a command received by the on-line viewer. Using the host-site, the viewer or customer is linked to the retailer's apparel site and images are passed from that site for view by the customer. Apparel is selected and virtually merged with the structure by forming an image including representations of both the structure and the selected-apparel.

29 Claims, 2 Drawing Sheets

U.S. PATENT DOCUMENTS

| | | | |
|---|---|---|---|
| 4,839,743 A | 6/1989 | Best et al. | |
| 4,843,574 A | 6/1989 | Gerber | |
| 4,845,636 A | 7/1989 | Walker | 364/479 |
| 4,854,880 A | 8/1989 | Nasby | |
| 4,872,056 A | 10/1989 | Hicks et al. | 358/183 |
| 4,885,844 A | 12/1989 | Chun | |
| 4,931,929 A | 6/1990 | Sherman | |
| 4,964,043 A | 10/1990 | Galvin | 364/401 |
| 4,991,005 A | 2/1991 | Smith | 358/93 |
| 5,053,956 A | 10/1991 | Donald et al. | 364/401 |
| 5,111,392 A | 5/1992 | Malin | 364/401 |
| 5,117,354 A | 5/1992 | Long et al. | 364/401 |
| 5,129,719 A | 7/1992 | Dombrosky | |
| 5,163,006 A | 11/1992 | Deziel | 364/470 |
| 5,163,007 A | 11/1992 | Slilaty | 364/470 |
| 5,195,030 A | 3/1993 | White | |
| 5,197,016 A | 3/1993 | Sugimoto et al. | |
| 5,206,804 A | 4/1993 | Thies et al. | 364/401 |
| 5,244,131 A | 9/1993 | Hollingsworth | |
| 5,339,252 A | 8/1994 | White et al. | 364/468 |
| 5,440,479 A | 8/1995 | Hutton | 364/401 |
| 5,495,568 A | 2/1996 | Beavin | 395/161 |
| RE35,184 E | 3/1996 | Walker | 364/479 |
| 5,504,845 A | 4/1996 | Vecchione | 395/119 |
| 5,510,846 A | 4/1996 | Guichard et al. | |
| 5,515,268 A | 5/1996 | Yoda | 364/401 |
| 5,530,652 A | 6/1996 | Croyle et al. | 364/470 |
| 5,539,677 A | 7/1996 | Smith | |
| 5,550,746 A | 8/1996 | Jacobs | |
| 5,550,976 A | 8/1996 | Henderson et al. | |
| 5,551,021 A | 8/1996 | Harada et al. | 395/600 |
| 5,555,496 A | 9/1996 | Tackbary et al. | 364/401 |
| 5,559,714 A | 9/1996 | Banks et al. | 364/479.03 |
| 5,568,595 A | 10/1996 | Yosefi et al. | |
| 5,593,072 A | 1/1997 | Hester et al. | |
| 5,598,344 A | 1/1997 | Dangelo et al. | |
| 5,603,043 A | 2/1997 | Taylor et al. | |
| 5,608,852 A | 3/1997 | Hashimoto et al. | 395/135 |
| 5,611,730 A | 3/1997 | Weiss | 463/20 |
| 5,625,781 A | 4/1997 | Cline et al. | |
| 5,631,974 A | 5/1997 | Lau-Kee et al. | |
| 5,680,314 A | 10/1997 | Patterson et al. | |
| 5,680,528 A | 10/1997 | Korszun | |
| 5,682,220 A | 10/1997 | Sherman et al. | |
| 5,684,963 A | 11/1997 | Clement | 395/226 |
| 5,687,259 A | 11/1997 | Linford | |
| 5,694,551 A | 12/1997 | Doyle et al. | 395/226 |
| 5,708,838 A | 1/1998 | Robinson | |
| 5,724,522 A * | 3/1998 | Kagami et al. | 705/26 |
| 5,729,699 A | 3/1998 | Hashimoto et al. | 395/227 |
| 5,737,729 A | 4/1998 | Denman | 705/401 |
| 5,740,801 A | 4/1998 | Branson | |
| 5,742,931 A | 4/1998 | Spiegelhoff et al. | 705/8 |
| 5,745,681 A | 4/1998 | Levine et al. | 395/200.3 |
| 5,754,434 A | 5/1998 | Delfer et al. | |
| 5,754,850 A | 5/1998 | Janssen | 395/615 |
| 5,768,591 A | 6/1998 | Robinson | |
| 5,774,670 A | 6/1998 | Montulli | |
| 5,781,714 A | 7/1998 | Collins et al. | |
| 5,802,530 A | 9/1998 | Van Hoff | |
| 5,806,046 A | 9/1998 | Curran et al. | |
| 5,822,216 A | 10/1998 | Satchell, Jr. et al. | 364/479.01 |
| 5,822,739 A | 10/1998 | Kara | 705/410 |
| 5,845,263 A | 12/1998 | Camaisa et al. | 705/27 |
| 5,848,399 A | 12/1998 | Burke | |
| 5,850,222 A | 12/1998 | Cone | 345/418 |
| 5,850,466 A | 12/1998 | Schott | |
| 5,852,809 A | 12/1998 | Abel et al. | 705/26 |
| 5,854,850 A | 12/1998 | Linford et al. | |
| 5,864,851 A | 1/1999 | Breitbart et al. | 707/8 |
| 5,870,140 A | 2/1999 | Gillberry | 348/160 |
| 5,870,718 A | 2/1999 | Spector | 705/26 |
| 5,870,771 A | 2/1999 | Oberg | 707/502 |
| 5,875,108 A | 2/1999 | Hoffberg et al. | |
| 5,880,740 A * | 3/1999 | Halliday et al. | 345/629 |
| 5,880,974 A | 3/1999 | Tarumi et al. | 364/578 |
| 5,881,234 A | 3/1999 | Schwob | |
| 5,884,029 A | 3/1999 | Brush, II et al. | 395/200.32 |
| 5,890,175 A | 3/1999 | Wong et al. | |
| 5,892,946 A | 4/1999 | Woster et al. | 395/680 |
| 5,895,454 A | 4/1999 | Harrington | 705/26 |
| 5,905,973 A | 5/1999 | Yonezawa et al. | 705/27 |
| 5,907,617 A | 5/1999 | Ronning | |
| 5,914,713 A | 6/1999 | Nario et al. | |
| 5,920,830 A | 7/1999 | Hatfield et al. | |
| 5,923,324 A | 7/1999 | Berry et al. | 345/334 |
| 5,930,769 A | 7/1999 | Rose | 705/27 |
| 5,937,391 A | 8/1999 | Ikeda et al. | |
| 5,946,665 A | 8/1999 | Suzuki et al. | |
| 5,950,165 A | 9/1999 | Shaffer et al. | 704/270 |
| 5,950,173 A | 9/1999 | Perkowski | 705/26 |
| 5,970,471 A | 10/1999 | Hill | |
| 5,974,400 A | 10/1999 | Kagami et al. | 705/26 |
| 5,978,570 A | 11/1999 | Hillis | |
| 5,978,833 A | 11/1999 | Pashley et al. | |
| 5,983,200 A | 11/1999 | Slotznick | 705/26 |
| 5,983,201 A | 11/1999 | Fay | 705/27 |
| 5,983,267 A | 11/1999 | Shklar et al. | 709/217 |
| 5,986,670 A | 11/1999 | Dries et al. | |
| 5,991,739 A | 11/1999 | Cupps et al. | |
| 5,995,943 A | 11/1999 | Bull et al. | 705/14 |
| 6,002,855 A | 12/1999 | Ladner et al. | 395/500.01 |
| 6,009,410 A * | 12/1999 | LeMole et al. | 705/14 |
| 6,009,413 A | 12/1999 | Webber et al. | 705/26 |
| 6,014,638 A | 1/2000 | Burge et al. | |
| 6,016,504 A | 1/2000 | Arnold et al. | |
| 6,017,157 A | 1/2000 | Garfinkle et al. | |
| 6,026,368 A | 2/2000 | Brown et al. | |
| 6,026,376 A | 2/2000 | Kenney | 705/27 |
| 6,026,377 A | 2/2000 | Burke | 705/27 |
| 6,029,141 A | 2/2000 | Bezos et al. | |
| 6,029,142 A | 2/2000 | Hill | |
| 6,037,936 A | 3/2000 | Ellenby et al. | |
| 6,047,268 A * | 4/2000 | Bartoli et al. | 705/35 |
| 6,052,729 A | 4/2000 | Robinson | |
| 6,058,417 A | 5/2000 | Hess et al. | |
| 6,064,978 A | 5/2000 | Gardner et al. | |
| 6,072,944 A | 6/2000 | Robinson | |
| 6,083,267 A | 7/2000 | Motomiya et al. | |
| 6,089,424 A | 7/2000 | Colquhoun | |
| 6,091,417 A | 7/2000 | Lefkowitz | |
| 6,094,644 A | 7/2000 | Hillson et al. | |
| 6,125,352 A | 9/2000 | Franklin et al. | |
| 6,134,593 A | 10/2000 | Alexander et al. | |
| 6,144,388 A * | 11/2000 | Bornstein | 345/629 |
| 6,170,017 B1 | 1/2001 | Dias et al. | |
| 6,177,936 B1 | 1/2001 | Cragun | |
| 6,236,979 B1 | 5/2001 | Kawabata | |
| 6,260,024 B1 | 7/2001 | Shkedy | |
| 6,293,284 B1 | 9/2001 | Rigg | |
| 6,301,044 B1 | 10/2001 | Huber et al. | |
| 6,304,851 B1 | 10/2001 | Kmack et al. | |
| 6,307,568 B1 | 10/2001 | Rom | |
| 6,310,627 B1 | 10/2001 | Sakaguchi | |
| 6,317,722 B1 * | 11/2001 | Jacobi et al. | 705/14 |
| 6,321,211 B1 | 11/2001 | Dodd | |
| 6,331,858 B2 | 12/2001 | Fisher | |
| 6,336,136 B1 | 1/2002 | Harris | |
| 6,339,763 B1 | 1/2002 | Divine et al. | |
| 6,343,264 B1 | 1/2002 | Fenton et al. | |
| 6,348,923 B2 | 2/2002 | Murata | |
| 6,349,300 B1 | 2/2002 | Graf et al. | |
| 6,353,770 B1 | 3/2002 | Ramsey et al. | |
| 6,356,264 B1 | 3/2002 | Yasui et al. | |

| | | | |
|---|---|---|---|
| 6,366,910 B1* | 4/2002 | Rajaraman | 707/5 |
| 6,381,583 B1* | 4/2002 | Kenney | 705/26 |
| 6,404,426 B1 | 6/2002 | Weaver | |
| 6,405,175 B1 | 6/2002 | Ng | |
| 6,405,176 B1 | 6/2002 | Toohey | |
| 6,417,861 B1 | 7/2002 | Deering et al. | |
| 6,437,782 B1 | 8/2002 | Pieragostini et al. | |
| 6,449,660 B1 | 9/2002 | Berg et al. | |
| 6,453,300 B2 | 9/2002 | Simpson | |
| 6,456,938 B1 | 9/2002 | Barnard | |
| 6,567,837 B1 | 5/2003 | Robinson | |
| 6,615,279 B1 | 9/2003 | Robinson | |
| 6,727,928 B1 | 4/2004 | Richter | |
| 6,771,801 B1 | 8/2004 | Fisher et al. | |
| 6,785,671 B1 | 8/2004 | Bailey et al. | |
| 6,903,756 B1* | 6/2005 | Giannini | 715/747 |
| 7,360,159 B2* | 4/2008 | Chailleux | 715/709 |
| 2002/0026349 A1* | 2/2002 | Reilly et al. | 705/14 |
| 2003/0051255 A1* | 3/2003 | Bulman et al. | 725/135 |

FOREIGN PATENT DOCUMENTS

WO     WO01/04840 A1     1/2001

OTHER PUBLICATIONS

"Herman Miller's New Online 'Room Planner' Makes Designing from Home Fun and Easy" PR Newswire (Mar. 18, 1999).

"High Fashion Meets High Tech" Business Wire (Sep. 28, 1998).

Szadkowkski, J. "Taking a Walkabout through room design," Washington Times (Sep. 17, 1998).

Cummings, J. "Dream It," Dayton Daily News (Nov. 12, 1998).

Zimmerman, K.A. "Land's End Adds Personalized Models to Web Site catalog Firm Offering Women Chance to Try On Clothes on a Virtual Model," Daily News Record, (Nov. 25, 1998).

"A Sampling of Computer Home Design Programs," Orlando Sentinel (Jun. 14, 1998).

www.weddingchannel.com, link to registry.

"Object-Oriented Analysis and Design," G. Booch, Addison Wesley Longman, Inc. ISBN: 0-8053-5340-2, 1994.

"On Remote Procedure Call," P. Soares, IBM Center for Advanced Studies Conference, vol. 2, pp. 215-267, IBM Press 1992.

"Lean Machines," Suzanne Kantra Kirschner, Rolling Stone, New York, Mar. 4, 1999, Issue 80, p. 91. 2pages.

"Smallest Hard Drive Unveiled," Rex Farrance, PC World, PC World Online, San Francisco, Sep. 9, 1998, p. 1.

http://compucloz.com/ImaginaRelease.html.

Kuchinskas, Susan "The E-commerce Cometh", Media week, vol. 8, No. 35, Sep. 21, 1998 [retrieved from Dialog on Apr. 30, 2002]. Retrieved from Dialog File: 15, Accession #: 01708699.

Hamlt, Francis "ModaCAD's Model for Fashion E-Commerce Points the Way to Imaging-Based Interactivity", Advanced Imaging, vol. 14, No. 2, Feb. 1999 [retrieved on Apr. 30, 2002]. Retrieved from Dialog File: 9, Accession #: 02388938.

"The Cosmopolitan Virtual Makeover" www.marketwiz.net?cosmo/press.

Seckler, Valerie "A Fashion Trip for Women on the Web", WWD, Aug. 17, 1998 [retrieved on Apr. 30, 2002]. Retrieved from Dialog File: 570, Accession #: 01683272.

Zimmerman, Kim "Fashion Trip Combines CD, Web Access", DNR, vol. 28. No. 101. Aug. 26, 1998 [retrieved on Apr. 30, 2002] Retrieved from Dialog File 9, Accession 190 : 02230722.

Orr, J.N., "Good Design," CAE, vol. 11, No. 6, pp. 62, Jun. 1992.

Taylor, W., "Windows Draw 4.0," PC/Computing, vol. 9, No. 4, p. 204. Apr. 1, 1996.

Anon., Newsbytes News Network, "Comdex—Free Graphics E-mail from SPC Software," Nov. 19, 1997.

Anon., "Sunglass Hut's Eyes Are Focused on the Internet," Chain Store Age Exeuctive, vol. 74, No. 9, p. 188+, Sep. 1998.

Langberg, M., Technology Testdrive Column in San Jose Mercury News, Jan. 10, 1999.

Grimm, M., "Levi Buttons up 501 Blitz," Brandweek, Nov. 22, 1993, p. 4.

Donnally, T., "Coming out of the Cabana," San Francisco Chronicle, May 4, 1996, p. E1.

Vine, R., "Pierre Mercier at Laage-Salomon," Art in America, vol. 84, No. 4, p. 125, Apr. 1996.

Johnson, R.C., "PC Video System Simplifies Security," Electronic Engineering Times, p. 33+, Apr. 8, 1996.

Carrano et al. "Data Abstraction and Problem Solving with C++", second edition, 1998, pp. 15-25.

No author, "Online Shops Linger in Future," HFN, v 70, n 32, p. 12, Aug. 5, 1996. Retrieved from Dialog File: 9, Acc# 01570816.

J.D. Biersdorfer, "Trying On Clothes in a Virutal Dressing Room," Oct. 14, 1999.

Fried, Ian "ModaCAD Latest to Seek Net Gain on Apparel," retrieved on Sep. 3, 1999 from www.apparelnews.net/Archive/082898/fashion/fashfeat.html.

No author, "Internet Venture Plans Virtual Fashion Mall," Nikkei Weekly, Feb. 22, 1999 [retrieved on Apr. 30, 2002]. Retrieved from Dialog File: 728, Accession #: 00885324.

www.amazon.com (*not enclosed*).

http://jsharones.com/prod013234.h(*not enclosed*).

http://www.cspring.com/aero_lettering/c_match.htm(*not enclosed*).

www.virtualmakeover.com.

www.sesoft.com/customer/index.html.

"The World's First Whole Body Scanners Bring True Human Forms to Computer Graphics," http://www.cyberware.com/pressReleases/first WB.html (May 11, 1995), 1 page.

"ModaCAD Latest to Seek Net Gain on Apparel," http:/www.apparelnews.net/Archive/082898/fashion/fashfeat.html (Aug. 28, 1998), 3 pages.

"Wicks and Wilson TriForm® BodyScan booth-first time in USA," www.wwl.co.uk.

"Wicks and Wilson announces its first Body Scanning booth," www.wwl.co.uk.

"Wicks and Wilson TriForms® 3D system helps to take goalkeeping into the space age," www.wwl.co.uk.

"Modecad, Inc. Launches Women's E-commerce 'Style' Shopping Site;" http//www.urlwire.com/newsarchive/050399a.html (May 3, 1999), 2 pages.

"Populating the Web: Pioneering a paradigm for photo realistic Avatars," http//www.avatarme.com/concept/concept.htm (Aug. 1999), 5 pages.

"PhotoModeler High Quality Photo-Textured Objects," http://www.eossystems.com/phototex.htm, (copyright 1995-1999), 10 pages.

*Land's End Direct Merchants* Catalogue (Sep. 1999), p. 101. www.landsend.com.

"Macys.Com To Sell Borderbund Makeover Software,"http// dailynews.yayoo.com/h/nm/19990903/tc/macyscom_2.html (Sep. 3, 1999), 2 pages/.

"If the Jeans Fit . . . p. 3: Three Hours Later," http//www.upside.com (Sep. 3, 1999), 1 page.

"When Off-The Rack Becomes Off-The-Net," *Scientific American Presents your Bionic Future* (Nov. 1999), 5 pages.

"Macy's Eases Swimsuit Fear with Database," http://www.wired.com/news/news/story/3226.html (Apr. 17, 1997), 2pages.

"Fashion Studo," http://www.dynagraphicsinc.com/main.htm (Sep. 14, 1999), 4 pages.

"What is the Dressing Sim?," http://www.toyobo.co.ip/e/mirai/dr...gsim/TopPage/aboutDressingSim.html (Sep. 14, 1999), 5 pages.

Nebojsa Jojic, http://ww.ifp. uiuc.edu/~jojic/ (Sep. 14, 1999), 5 pages.

A Framework for Garment Shopping over the Internet, Jojic et al., *Handbook of Electronic Commerce* (May 1999), 22 pages.

Media Motion Publications, Flash 'N Fashion (Copyright1995-1997), 3 pages. www.media-motion.com/.

Meta Creations-Poser 4, (Sep. 14, 1999), 3 pages. www.metacreations.com.

"Finding a Look," *New York Times* (Oct. 14, 1999), 1 page.

"3D Metrics-Capturing the Dimension of Life," http://www.3dmetrics.com (copyright1999), 1 page.

"Welcome to Click Dress," http://www.hi-pic.co.il/ (Dec. 7, 1999), 1 page.

"Killer Loop Virtual Preview," http://www.killerloopeyewear.com/html/klvp.html (Dec. 2, 1999), 1 page.
www.peepsun.com.
http://marketwiz.net.
www.pearlevision.com.
www.beyond.com.

http.//orders.xoom.com.
www.itreviews.com.
"Welcome to Ray Ban Virtual Preview," http://www.rayban.com/htm/rbvp.html (Dec. 2, 1999), 2 pages.

* cited by examiner

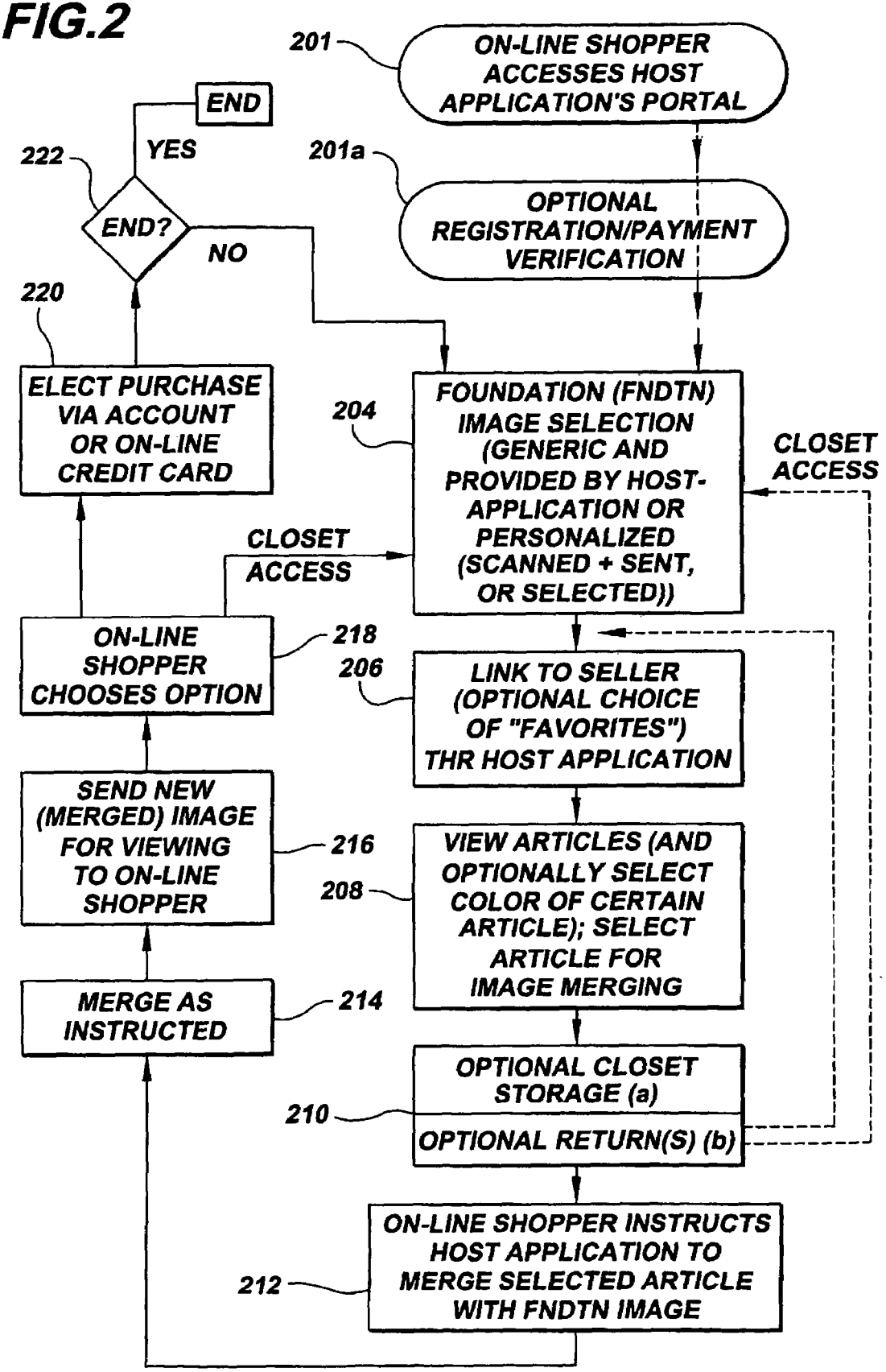

MERGED IMAGES VIEWED VIA A VIRTUAL STORAGE CLOSET

RELATED PATENT DOCUMENTS

This application is a continuation of U.S. patent application Ser. No. 09/527,723 filed on Mar. 17, 2000 and issued as U.S. Pat. No. 6,903,756 (to which priority is claimed under 35 U.S.C.§120 for common subject matter), which is based on and claims priority for common subject matter under §120 to both U.S. Provisional Patent Applications, Nos. 60/159,476 and 60/167,493, respectively filed Oct. 14, 1999 and Nov. 24, 1999.

FIELD OF THE INVENTION

The present invention relates generally to e-commerce and, more specifically, to use of linked web servers sites for on-line shopping.

BACKGROUND OF THE INVENTION

The consumer in today's market is limited to a particular retailer's or department store's inventory, selection and styles. Traditionally, a consumer shops for items from different stores with the anticipation and hope that the items will coordinate. Alternatively, a consumer will wait for an opportunity to try on all the different items purchased and return those items that do not coordinate. Recent technological advances have attempted to enhance the shopping ability through the use of e-commerce, sometimes referred to as "online buying" or "online shopping."

There are differences inherent between "online buying" and "online shopping" in that current e-commerce transactions are based on the individual buying goods or services online that they have either decided to buy prior to logging on to the internet or find as a result of bargain hunting on the internet. There is very little, if any, true shopping on the internet. Most women define shopping as an "experience" "fun" "exciting" and the like. True shopping is going to a mall or department store with the intention of buying yet to be determined goods or services. Few consumers are getting on the internet with the same mindset that they have before they physically go shopping. It is the difference between logging onto the internet to buy an additional pair of Levi's Jeans and going shopping and then coming home with 2 pairs of Levi's Jeans, a belt, 2 sweaters and 2 shirts.

Amazon, for instance, tries to recreate the "shopping experience" by offering reviews by other customers and suggestions for other books which may interest the shopper based on the book the consumer is currently purchasing.

SUMMARY OF THE INVENTION

One aspect of the present invention is generally directed to a method for on-line viewing of an article previously stored in a virtual closet (e.g., an apparel closet) on another structure. An example implementation of this aspect of the present invention includes: providing a host-site accessible to an on-line viewer and web-linkable to at least one article-provider site, the article provider-site having images of articles for view via the web. The on-line viewer is linked to the host-site and to a virtual closet maintained by the host-site. The host-site selects a structure in response to a command received by the on-line viewer, and using the host-site, the viewer is linked to the at least one article-provider site and images (including those in the virtual closet) are passed from that site for view by the on-line viewer; and merging a selected one of the articles with the structure by forming an image including representations of both the structure and the selected article.

Another aspect of the present invention is directed to addressing one of the most crucial features missing when one attempts to shop for clothing and accessories online; this feature is the ability to try the different items on oneself. In addition to the portal concept, this aspect of the present invention more clearly identifies to the consumer the problem, by personalizing and enhancing the "shopping experience" by allowing the consumer to have their own "internet mirror" or "internet fitting room." A personalized, secure environment is created which permits the consumer to truly "shop" at their leisure and convenience. An optional feature allows each user a certain amount of storage capacity, referred to as a "closet," where the user can store different items from multiple stores as they move from store to store, each time bringing back different items to mix and match, coordinate and so on. This storage space allows the consumer to put items "on hold" for a limited period of time without purchasing them. This feature allows consumers to return at a later date and purchase these items and continue shopping for other items without starting the whole process over again.

The above-mentioned main feature is a "body-registry" which enables individuals in purchasing clothing and accessories online to have an enhanced shopping experience by having a "closet" with both their previous and potential purchases to mix and match and create new outfits. For instance, a woman could go to this virtual "closet" and pull out her favorite article (e.g., shirt) and go shopping for a new skirt, shoes, earrings and purse to create a "new outfit."

Another embodiment has fashion advice with latest fashions and styles and links to the retailers that carry those fashions. Retailers could be invited to write-up the commentary or nationally-known magazines may want to offer their fashion advice online.

In another specific embodiment a question and answer section answers common questions such as "What goes with . . . ?" and others. The fashion advice section as it grows includes a search section that would allow the consumer to find past articles relating to their particular interest.

In yet another specific embodiment, a review section, set up by topics, enables a consumer to relate his or her retail experiences, both good and bad, talk fashion and style, give advice, or to talk about items of interest.

The above-identified features allow a consumer to walk through an entire mall (or different malls) of stores picking and choosing selected item(s) to build the ultimate outfit or wardrobe. A consumer may pause, store, put-on-hold, and shop twenty-four hours per day at his or her convenience.

A more particular example embodiment of the present invention is directed to a method of on-line apparel shopping. The method includes providing a host-site accessible to an on-line viewer (e.g., customer) and web-linkable to an entity, such as a retailer, having an apparel site. The retailer's apparel site has images of articles such as apparel for viewing over the web, and the on-line viewer is linked to the host-site. The consumer selects a structure, such as a photograph of a person captured in system memory, in response to a command received by the on-line viewer. Using the host-site, the viewer or customer is linked to the retailer's apparel site and images are passed from that site for view by the customer. Apparel is selected and virtually merged with the structure by forming an image including representations of both the structure and the selected apparel.

The above summary of the present invention is not intended to describe each illustrated embodiment or every implementation of the present invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2 is a flowchart of an example manner for implementing one aspect of the present invention.

Figure 1:
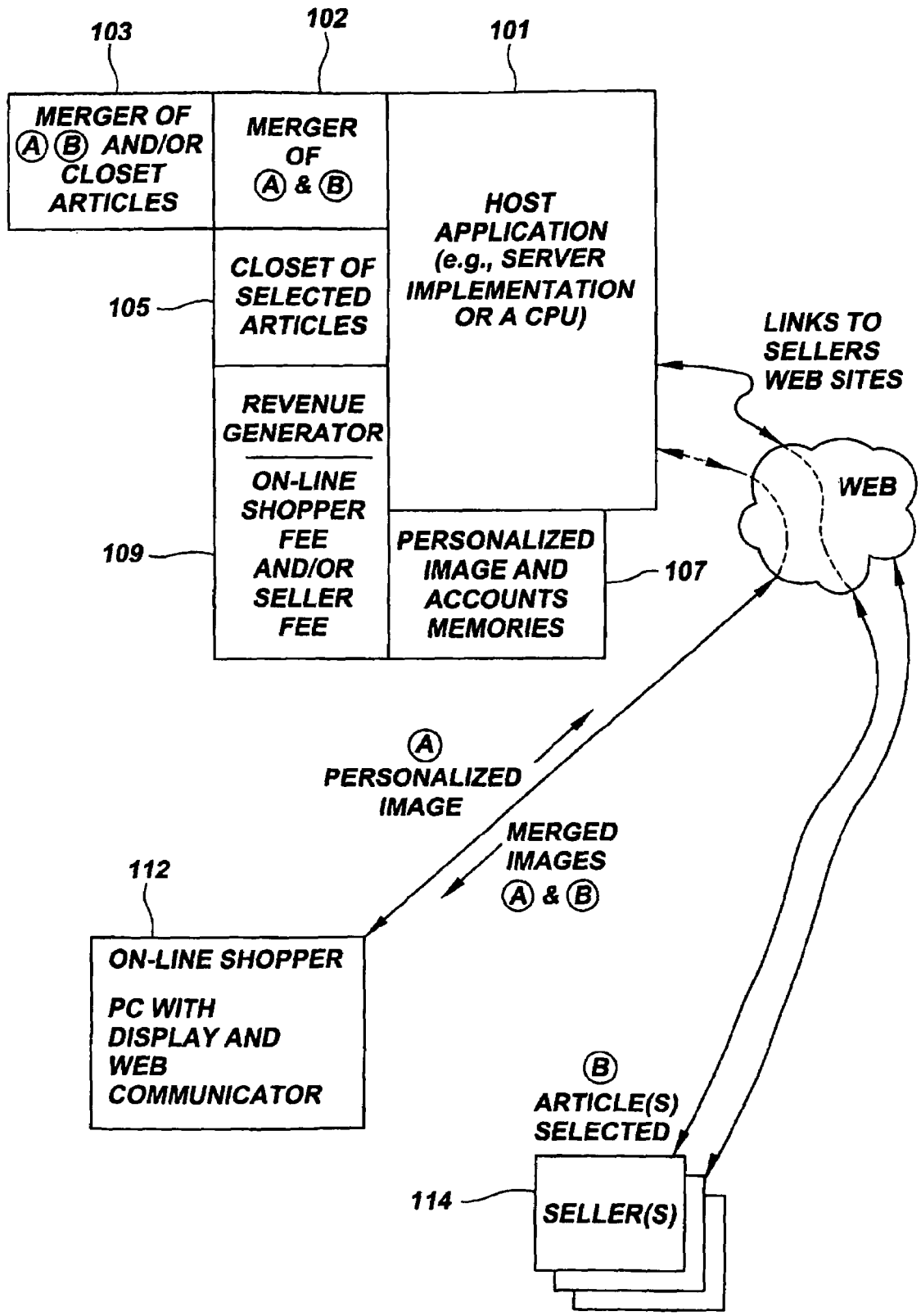
FIG. 1 illustrates a block diagram of a system for implementing the present system in accordance with one example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to a method and system involving e-commerce over interconnected communication networks such as those currently known as the Internet. The present invention is particularly suited for conveniently bringing virtual apparel into customers' respective homes and permitting customers to try on the apparel before accepting/purchasing the apparel. While the present invention is not necessarily so limited, a better understanding of the invention will be found by reading the detailed description and exemplary embodiments that follow.

FIG. 1 illustrates an example embodiment of a method and system for implementing the present system. The system includes a host application server 101 including several example functional blocks. These blocks include a block 102 that merges two images A and B (e.g. corresponding to a personalized or generic article identified by the on-line shopper, and a foundation or structure image to be merged with the identified article). Another block 103 permits merging of images selected from A, B, and/or articles previously stored in a "closet," depicted as block 105. Another block 107 includes personalized images and an inventory of generic images corresponding to the foundation or structure. A revenue generator block 109 provides fee generation from on-line shoppers who subscribe to the host application server per on-line or off-line agreement, and/or fee generation from retailers (or sellers) and others such as magazine publishers desiring participation and benefit from the system of FIG. 1.

The on-line shopper uses a PC or intelligent black box 112 to access the host application server 101. Through this access, the on-line shopper either selects a generic structure from an inquiry of such structures provided by block 107 or provides a personalized image (for example, a scanned image of himself or of his house) to be used as the structure. Using the host application server 101, the on-line shopper is coupled through the web to a seller, depicted at block 114. Images of selectable articles are communicated back to the on-line shopper over the web and through the host application server 101. The on-line shopper selects one or more articles from at least one of the sellers for storage in the closet 105, and/or for merging with the previously-selected structure. Similarly, the structure can be changed per a command from the on-line shopper so as to merge the selected article(s) with different structures. In response, the host application server 101 processes images corresponding to the article and structure and generates a new image including representations of both the structure and the article.

FIG. 2 is a flow chart of an example process for implementing the example system of FIG. 1, according to the present invention. As discussed above, after accessing the host application server 201, optionally the host application server verifies registration/payment as is conventional with current on-line shopping as depicted at 201a. At block 204 the structure or foundation is selected as discussed above, and at block 206 the link is made to the seller. At block 208 the article(s) is viewed by the on-line shopper and, optionally, a selection of a color and/or size for the article is made. Next, the on-line shopper selects the article as a candidate for storage in the closet and/or for merging with the structure.

At block 210 the on-line shopper instructs the host application server to store the article in the closet by returning to block 204, merge with the structure as depicted at block 212, or return to block 206 for linking to the same seller or another seller for additional viewing.

From block 212 flow proceeds to block 214 where the new image is created per the merger instruction.

Next, at block 216, the new image is sent for viewing to the on-line shopper.

At block 218 the on-line shopper chooses one of multiple options. Either the closet is accessed and the on-line shopper returns to block 204, or an election is made to purchase the article and/or other articles that may have been stored in the closet as depicted in block 220. From block 220, flow proceeds to block 222 where the on-line shopper decides to return to block 204 or end the transaction.

Example articles can be: A) clothing; B) paint; C) furniture; D) glassware; E) landscaping; F) orthodontic and teeth ware; G) cabinetry; H) plastic-surgery type enhancements; I) car/person.

Example foundation for merger with corresponding article(s) can be: a) person, pet; b) house, cars, etc.; c) house, cars, office, etc.; d) kitchen, face; e) yard; f) mouth; g) rooms in office/house; h) person (chest, face, belly, etc.); I) person/car.

In another example embodiment according to the present invention, an important advantage relating to color matching is achieved using a commonly-used color standard that covers sufficient color variations to permit various articles to be matched to one another. In one more specific embodiment, an industry color-standardization scheme is used. Examples include: Exxel Color Match Guide (see http://sharones.com/prod013234.htm) and Color match Chart (http://www.c-springs.com/aero_lettering/c_match.htm). More sophisticated color standardization schemes include the above examples in combination with equipment specifically identifying a frequency range corresponding to the color of the article in question or the equipment approach by itself.

Example equipment of this type includes optics-based detectors adapted to provide a measured (color) frequency in a given light condition/environment. For example, white light may be used along with selected background materials characterized within certain selected ranges of reflectivity. Other definitional parameters needed and/or useful in connection therewith will be apparent to those skilled in the art.

In a particular application, the color frequencies measured for the articles to be matched are reported and provided in the form of a tag that is carried with the article, electronically for the web server shopping function and, optionally, as a supplemental hard-copy coded label (e.g., as part of or as a supplementation to the coding used on a bar code label). In a more particular implementation involving this use as part of the bar code label, the conventional bar code scanners and bar code generators are modified and adapted to receive the color frequency of the article and to conveniently report the color frequency in conjunction with the electronic shopping function and/or the conventional/reality shopping applications.

In yet another more specific embodiment, the closet of selected articles (as described for example in connection with block 105 of FIG. 1) is electronically defined using a partial-data set corresponding to each of the closeted articles. In one application thereof, the partial-data set comprises an outline definition of each of the articles along with the color frequency codes linked to the various sections of each article, as necessary to fully define the article in terms of article shape and color. Further, the size of the article is also stored as part of the partial-data set. Collectively, these various pieces advantageously define all needed aspects of each article in the closet without having to consume excessive amounts of memory and without requiring excessive processing to recreate the article for view by the user.

The virtual closet discussed above in connection with FIG. 1 can be used to permit the shopper to buy or hold (without buying) an article and subsequently retrieving the article for matching to other articles in terms of structure, size, color and other stylistic aspects. In applications concerned with limited memory bandwidth, the host application can provide a maximum amount of storage space for each shopper, with additional storage space being provided for a fee. These data stored in such memory is limited to a fixed-period, e.g., one month, with extensions being provided for yet additional consideration, such as a monthly fee or purchases of items stored in the closet during an immediately preceding period. This approach advantageously encourages the shoppers to revisit the host application repeatedly to access their personalized virtual closet, and advantageously provides on-going advertising for (which is also optionally billed on a related, on-going basis to) the seller/retailers.

According to another aspect of the present invention, on-line shoppers (for example 112 of FIG. 1) are provided a number of selectable icons or other data permitting feedback from the host/server (for example 101 of FIG. 1). Examples include: expert fashion advice (e.g., professional consultants employed by the retailers (for example sellers 114 of FIG. 1), outside fashion consultants and/or employees of the entity providing the host application (101 of FIG. 1); on-line offers from the sellers (discounts, sales, etc.); updates on up-coming styles, colors, the most recent and hottest fashions. Each of these various offerings is optionally categorized for convenient selection by the shopper/user, for example, by category, style, activities, retailers. Advantageously, this application permits the host application to provide the sellers unique demographic information pertaining to particular customers' interests, selection trends and other data useful in attracting the shoppers to the retailers.

For convenience to the shoppers, a feedback icon can be used to provide a "favorite retailers" list to be defined by each shopper. When the shopper logs on to the host application, any of these favorite retailers can be immediately linked to for various uses. Examples include: reviewing closeted items and making changes thereto for a particular retailer, checking sales at that particular retailer and/or continuing to shop at a particular retailer without being required to return to the host application web site. Further, as a shopper links from retailer to retailer (the "Favorites"), a "shopping basket" can be selected and filled as the shopper accesses the articles.

According to another important aspect of the present invention, the host application includes a search engine that searches selected, or all, participating sellers/retailers for particular merchandise, as identified by the on-line shopper. In one implementation, this service is provided to the shopper using a selectable icon or other feedback data as discussed above. At this point, the host application can: list all such retailers and allow the shopper to link to their web site; virtually pull the item from the respective web sites and allow the shopper to "try on" the article or store it in the closet (with a variation which optionally permits the shopper to change the size and color); and/or a combination of these approaches.

Implementation of the merging function can be accomplished using one or more of a variety of currently-available methods. Examples of such methods include those used in connection with web sites:

www.virtualmakeover.com, and www.segasoft.com/customer/index.html.

Other example implementations are described and illustrated in U.S. Pat. No. 5,930,769 entitled, "System and Method for Fashion Shopping." Various types of software and hardware can be used to implement each aspect of the system and method described.

As noted above, the present invention is applicable to a number of techniques for merging various types of structures, or foundations, with one or more corresponding articles. The present invention should not be considered limited to the particular examples described above, but rather should be understood to cover all aspects of the invention as fairly set out in the attached claims. For example, the present invention could be characterized as covering one or more of the above characterized features. Accordingly, various modifications, equivalent processes, as well as numerous structures to which the present invention may be applicable will be readily apparent to the skilled artisan upon review of the present specification.

I claim:

1. A method for on-line viewing of articles, comprising:
providing access to a host-site that is web accessible to an on-line viewer and web-linkable to different article-provider sites, the article provider-sites having images of articles for view via the web;
linking the on-line viewer to the host-site and receiving a command from the on-line viewer that selects a structure and at least one type of the articles;
using the host-site, in response to the command, to link to the different article-provider sites and to pass and store in a memory respective images of articles of said type from the different article-provider sites for view by the on-line viewer via a web link to the host-site;
using the host site, generating a composite image from passed images and the structure, the composite image representing, for viewing as a single object, the structure modified with a first article that corresponds to one of the passed images and at least one other article that corresponds to another one of the passed images from the article-provider sites, wherein the structure is an apparel-wearable model, and the first article is apparel;
storing the passed images as a virtual closet that is associated with the on-line viewer;
presenting the virtual closet to the on-line viewer;
retrieving one of the stored images from the virtual closet in response to a selection by the on-line viewer; and
using the host site, generating another composite image from the one retrieved image and the structure, the other composite image representing, for viewing as a single object, the structure modified with a second article that corresponds to the one retrieved image.

2. The method of claim 1 wherein generating the composite image includes scaling the passed image of the first article to fit the structure such that the passed image of the first article and the structure are commonly-scaled.

3. The method of claim 1, wherein the host-site includes different structures for selection by the on-line viewer.

4. The method of claim 1, wherein the passed image of the at least one other article is obtained from a different one of the article-provider sites than the passed image of the first article.

5. The method of claim 1, wherein the first article and the at least one other article are complementing apparel.

6. The method of claim 5, wherein the complementing apparel includes top wear and leg wear.

7. The method of claim 1, wherein the at least one other article is one of the stored images.

8. The method of claim 7, wherein the at least one other article was stored during a different host-site communication session.

9. The method of claim 1, wherein the one retrieved image is retrieved by the host-site in response to another command.

10. A method for on-line viewing of articles, comprising:
providing access to a host-site that is web accessible to an on-line viewer and web-linkable to different article-provider sites, the article provider-sites having images of articles for view via the web;
linking the on-line viewer to the host-site and receiving a command from the on-line viewer that selects a structure and at least one type of the articles;
using the host-site, in response to the command, to link to the different article-provider sites and to pass and store in a memory respective images of articles of said type from the different article-provider sites for view by the on-line viewer via a web link to the host-site;
using the host site, generating a composite image from passed images and the structure, the composite image representing, for viewing as a single object, the structure modified with a first article that corresponds to one of the passed images and at least one other article that corresponds to another one of the passed images from the article-provider sites, wherein the structure is an apparel-wearable model and the first article is apparel;
facilitating purchase of the first article in response to a selection by the on-line viewer;
storing the passed image corresponding to the first article in a virtual closet for the on-line viewer;
retrieving the passed image corresponding to the first article from the virtual closet;
receiving a command, from the on-line viewer, that identifies at least one of the articles that has not been purchased; and
using the host site, generating another composite image representing, for viewing as a single object, the structure modified with the purchased first article and the at least one of the articles that has not been purchased.

11. The method of claim 1, wherein storing the passed images as a virtual closet consists of storing images of articles of said at least one type.

12. The method of claim 1, wherein the first article and the at least one other article are of said at least one type.

13. The method of claim 1, wherein storing the passed images as a virtual closet includes storing the passed image of the first article and the passed image of the at least one other article.

14. The method of claim 1, wherein storing the passed images as a virtual closet consists of storing images of articles that are combined with the structure for viewing, as a single object, by the on-line viewer.

15. The method of claim 1, wherein storing the passed images as a virtual closet consists of storing images of clothing articles and accessories for an outfit that is combined with the apparel-wearable model for viewing, as a single object, by the on-line viewer.

16. For use with a host-site that is web accessible to an on-line viewer and web-linkable to different article-provider sites that have images of articles for view via the web, a method for on-line viewing of articles, the method comprising:
linking the on-line viewer to the host-site and prompting the on-line viewer to enter a command that selects an apparel-wearable model and at least one type of the articles;
using the host-site to link to the different article-provider sites and to pass and store in a memory respective images of articles of said at least one type from the different article-provider sites for view by the on-line viewer via a web link to the host-site;
using the host site, generating a composite image representing, for viewing as a single object, the apparel-wearable model modified with at least two articles corresponding to ones of the passed images, wherein one of the at least two articles is apparel;
using the host site, storing ones of the passed images as a virtual closet that is associated with the on-line viewer;
presenting the stored images from the virtual closet to the on-line viewer for viewing; and
in response to the on-line viewer modifying data, updating at least one of the stored images in the virtual closet and the modified apparel-wearable model according to the modified data.

17. The method of claim 16, wherein storing ones of the passed images as a virtual closet consists of storing images of clothing articles and accessories for an outfit that is combined with the apparel-wearable model for viewing, as a single object, by the on-line viewer.

18. The method of claim 16, wherein the at least two articles are different types of clothing.

19. The method of claim 16, wherein storing ones of the passed images as a virtual closet consists of storing images of the at least two articles used to generate the composite image.

20. The method of claim 16, wherein storing ones of the passed images as a virtual closet includes storing ones of the passed images corresponding to a search result for articles of said at least one type.

21. The method of claim 16, wherein storing ones of the passed images as a virtual closet includes
storing images of the at least two articles used to generate the composite image, and
storing ones of the passed images corresponding to a search result for articles of said at least one type.

22. The method of claim 16,
wherein storing ones of the passed images as a virtual closet includes
storing images of the at least two articles used to generate the composite image, and
storing ones of the passed images corresponding to a search result for articles of said at least one type, and
further comprising
retrieving one of the stored images corresponding to a search result for purchase by the viewer, and generating another composite image representing, for viewing as a single object, the apparel-wearable model modified with the retrieved stored image for purchasing the article that the retrieved stored image represents.

23. The method of claim 16, wherein storing ones of the passed images as a virtual closet consists of storing images of the at least two articles used to generate the composite image as shopping results for subsequent purchase.

24. The method of claim 16, wherein updating the stored images in the virtual closet includes saving another one of the passed images in the virtual closet, the other passed image corresponding to another article selected by the on-line viewer for display on the apparel-wearable model.

25. The method of claim 16, wherein updating the modified apparel-wearable model includes modifying the composite image to include another one of the passed images, the other passed image corresponding to another article selected by the on-line viewer for display on the apparel-wearable model.

26. For use with a host-site that is web accessible to an on-line viewer and web-linkable to different article-provider sites that have images of articles for view via the web, a method for on-line viewing of articles, the method comprising:

linking the on-line viewer to the host-site and prompting the on-line viewer to enter a command that selects a structure and at least one type of the articles;

using the host-site to link to the different article-provider sites and to pass and store in a memory respective images of articles of said type from the different article-provider sites for view by the on-line viewer via a web link to the host-site;

using the host site, generating a composite image from ones of the passed images and the structure, the composite image representing, for viewing as a single object, the structure modified with a first article that corresponds to one of the passed images and at least one other article that corresponds to another one of the passed images, wherein the structure is an apparel-wearable model and the first article is apparel;

storing ones of the passed images as a virtual closet that is associated with the on-line viewer for display and review by the on-line viewer;

in response to a selection by the on-line viewer, manipulating display of the modified structure based on at least one of the stored images from the virtual closet; and using the host site and for generating another composite image, providing access to the structure and the stored images from the virtual closet.

27. The method of claim 26, wherein storing ones of the passed images as a virtual closet includes storing the passed images corresponding to the first article and the at least one other article.

28. The method of claim 27, further comprising:
providing the on-line view with a prompt to manipulate a display parameter of the first article; and
modifying the composite image to reflect the manipulated display parameter of the first article.

29. The method of claim 26, wherein storing ones of the passed images as a virtual closet includes
storing images of the first article and the at least one other article, and
storing ones of the passed images corresponding to a search result for articles of said at least one type.

* * * * *